United States Patent
Fouda et al.

(10) Patent No.: US 11,905,818 B2
(45) Date of Patent: Feb. 20, 2024

(54) DEEP LEARNING METHODS FOR WELLBORE PIPE INSPECTION

(71) Applicant: Halliburton Energy Services, Inc., Houston, TX (US)

(72) Inventors: Ahmed Elsayed Fouda, Spring, TX (US); Junwen Dai, The Woodlands, TX (US); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 419 days.

(21) Appl. No.: 17/114,712

(22) Filed: Dec. 8, 2020

(65) Prior Publication Data

US 2022/0178245 A1    Jun. 9, 2022

(51) Int. Cl.
*E21B 47/002* (2012.01)
*G06N 3/04* (2023.01)
(Continued)

(52) U.S. Cl.
CPC .......... *E21B 47/0025* (2020.05); *G06N 3/04* (2013.01); *G06N 3/08* (2013.01); *G06T 3/4046* (2013.01)

(58) Field of Classification Search
CPC ........ E21B 47/0025; G06N 3/04; G06N 3/08; G06T 3/4046
See application file for complete search history.

(56) References Cited

U.S. PATENT DOCUMENTS 6,344,741 B1    2/2002  Giguere et al.
7,960,969 B2    6/2011  Mouget et al.
(Continued)

FOREIGN PATENT DOCUMENTS

WO    2015157270 A1    10/2015
WO    2019168698 A1     9/2019
(Continued)

OTHER PUBLICATIONS

Omar et al., Inversion-based workflow for oilfield nested multicasing evaluation using electromagnetic low-frequency measurements, 2017, AIP Conf. Proc. 1806, 110020, pp. 1-10 (Year: 2017).*

(Continued)

*Primary Examiner* — Mohamed Charioui
*Assistant Examiner* — Lyudmila Zaykova-Feldman
(74) *Attorney, Agent, or Firm* — DeLizio, Peacock, Lewin & Guerra, LLP

(57) ABSTRACT

Methods and systems for inspecting the integrity of multiple nested tubulars are provided. A method for inspecting the integrity of multiple nested tubulars can comprise conveying an electromagnetic pipe inspection tool inside the innermost tubular of the multiple nested tubulars; taking measurements of the multiple nested tubulars with the electromagnetic pipe inspection tool; inverting the measurements for a tubular integrity property of each individual tubular of the multiple nested tubulars to provide inverted tubular integrity properties; arranging the inverted integrity properties into an inverted image representative of an estimated tubular integrity property of each individual tubular; and feeding the inverted image to a pre-trained deep neural network (DNN) to produce a corrected image, wherein the DNN comprises at least one convolutional layer, and wherein the corrected image comprises a representation of the tubular integrity property of each individual tubular of the multiple nested tubulars.

20 Claims, 9 Drawing Sheets

(51) Int. Cl.
*G06N 3/08* (2023.01)
*G06T 3/40* (2006.01)

(56) References Cited

U.S. PATENT DOCUMENTS

| | | | |
|---|---|---|---|
| 9,310,338 B2 | 4/2016 | Yarbro et al. | |
| 9,715,034 B2 | 7/2017 | Omeragic et al. | |
| 9,983,173 B2 | 5/2018 | Aslanyan et al. | |
| 10,234,591 B2 | 3/2019 | Wu et al. | |
| 10,260,854 B2 | 4/2019 | Zhang | |
| 10,502,044 B2 | 12/2019 | Fouda et al. | |
| 10,533,411 B2 | 1/2020 | Fouda et al. | |
| 10,641,594 B2 | 5/2020 | San Martin et al. | |
| 10,662,758 B2 | 5/2020 | Donderici et al. | |
| 10,670,563 B2 | 6/2020 | Fouda et al. | |
| 10,725,194 B2 | 7/2020 | Fouda et al. | |
| 10,823,873 B2 | 11/2020 | Fouda et al. | |
| 2006/0095239 A1* | 5/2006 | Frenkel | G01V 3/28 703/5 |
| 2011/0255371 A1* | 10/2011 | Jing | G01V 1/288 367/73 |
| 2016/0160629 A1* | 6/2016 | Donderici | E21B 47/00 324/238 |
| 2016/0238723 A1* | 8/2016 | Brytik | G01V 99/005 |
| 2017/0038493 A1* | 2/2017 | Wu | E21B 47/006 |
| 2017/0191361 A1* | 7/2017 | Khalaj Amineh | G01V 3/38 |
| 2018/0074220 A1* | 3/2018 | David | G01V 3/26 |
| 2018/0100950 A1* | 4/2018 | Yao | E21B 47/085 |
| 2018/0106763 A1 | 4/2018 | Fouda et al. | |
| 2019/0129057 A1* | 5/2019 | Fanini | G01V 3/34 |
| 2019/0147125 A1 | 5/2019 | Yu et al. | |
| 2019/0162870 A1 | 5/2019 | San Martin et al. | |
| 2019/0218904 A1 | 7/2019 | Fouda et al. | |
| 2019/0339210 A1* | 11/2019 | Stewart | G01M 3/007 |
| 2019/0390544 A1 | 12/2019 | Dai et al. | |
| 2020/0081148 A1 | 3/2020 | Capoglu et al. | |
| 2020/0200940 A1 | 6/2020 | Fouda et al. | |
| 2020/0271818 A1 | 8/2020 | Fouda et al. | |
| 2020/0309986 A1* | 10/2020 | Donderici | G01V 3/26 |
| 2021/0209339 A1* | 7/2021 | You | G06N 3/04 |

FOREIGN PATENT DOCUMENTS

| | | |
|---|---|---|
| WO | 2020005194 A1 | 1/2020 |
| WO | 2020205085 A1 | 10/2020 |

OTHER PUBLICATIONS

Rizzuti et al., A non-linear full-wavefield inversion method for ultrasound imaging in non-destructive testing, 2017, Technical Report, 10.13140/RG.2.2.22953.29284, pp. 1-10. (Year: 2017).*

Ortiz-Aleman et al., Two-phase oil-gas pipe flow imaging by simulated annealing, 2005, J. Geophys. Eng. 2 , pp. 32-37. (Year: 2005).*

"Acoustic Conformance Xaminer® (ACX™) Tool Identifies Low-Rate Gas Leak in Production Casing", Halliburton Case Study, 2016, 2 pages.

"Electromagnetic Pipe Xaminer® V (EPX™ V) Tool", Halliburton Wireline & Perforating, 2019, 2 pages.

Brill, "Electromagnetic Casing Inspection Tool for Corrosion Evaluation", International Petroleum Technology Conference, 2011, 14 pages.

Brownlee, "A Gentle Introduction to k-fold Cross-Validation", Machine Learning Mastery, Retrieved from the Internet <URL: https://machinelearningmastery.com/k-fold-cross-validation/>, 2018, 8 Pages.

Buduma, et al., "Fundamentals of Deep Learning Designing Next-Generation Machine Intelligence Algorithms", O'Reilly Media; 1st edition (Jul. 4, 2017), 288 pages.

Dutta, et al., "Analysis and Interpretation of Multi-Barrier Transient Electromagnetic Measurements", SPWLA 61st Annual Logging Symposium, 2020, 13 pages.

Rourke, et al., "Multi-Tubular Corrosion Inspection Using a Pulsed Eddy Current Logging Tool", International Petroleum Technology Conference, 2013, 6 pages.

San Martin, et al., "New High-Definition Frequency Tool for Tubing and Multiple Casing Corrosion Detection", Society of Petroleum Engineers, 2017, 14 pages.

PCT Application No. PCT/US2020/063880, International Search Report, dated Aug. 17, 2021, 3 pages.

PCT Application No. PCT/US2020/063880, Written Opinion, dated Aug. 17, 2021, 6 pages.

* cited by examiner

DEEP LEARNING METHODS FOR WELLBORE PIPE INSPECTION

TECHNICAL FIELD

The disclosure generally relates to the field of surveying boreholes (i.e. wellbores), and particularly inspecting tubulars disposed therein.

BACKGROUND

Most, if not all, oil and gas wells, one or more tubulars are disposed in a wellbore of the well. In many instances, multiple tubulars are nested circumferentially, i.e. with smaller diameter tubulars disposed within larger diameter wellbores. Over time these tubulars experience corrosion due to many causes, including electrochemical, chemical, or mechanical origins. Early detection of metal loss due can be very valuable to oil and gas wells management, as failure detection of metal loss may lead to expensive remedial measurements and intervention in production wells.

BRIEF DESCRIPTION OF THE DRAWINGS

Embodiments of the disclosure may be better understood by referencing the accompanying drawings.

DESCRIPTION

The following detailed description refers to the accompanying drawings that show, by way of illustration and not limitation, various embodiments. These embodiments are described in sufficient detail to enable those skilled in the art to practice these and other embodiments. Other embodiments may be utilized, and structural, mechanical, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In inspecting downhole tubulars (i.e. pipes) for metal loss due to corrosion, one or more measurements can be taken using an electromagnetic pipe inspection tool. The raw measurements can be taken with a frequency-domain tool or a time-domain tool and can be omnidirectional or directional (i.e. azimuthal). An inversion can be applied to the raw measurements to provide inverted tubular integrity properties for each individual tubular of multiple nested tubulars, and the inverted tubular integrity properties can be arranged into an inverted image representative of estimated tubular integrity properties of each individual tubular. Due to limitations of the inversion process, it is possible for artifacts to appear in the inverted image. These inversion artifacts, for example, could inadvertently indicate metal loss at a certain depth where no metal loss actually exists. To deal with these potential artifacts and generally clarify the inverted image, the inverted image can be fed to a pre-trained deep neural network (DNN) having at least one convolutional layer to produce a corrected image representative of a corrected tubular integrity property of each individual tubular of the multiple nested tubulars. By pre-training a DNN having at least one convolutional layer, the DNN can quickly provide an accurate processed image. Further, the accuracy of the DNN can continue to be enhanced with further training thereof by adding real data to the training database.

Figure 1:
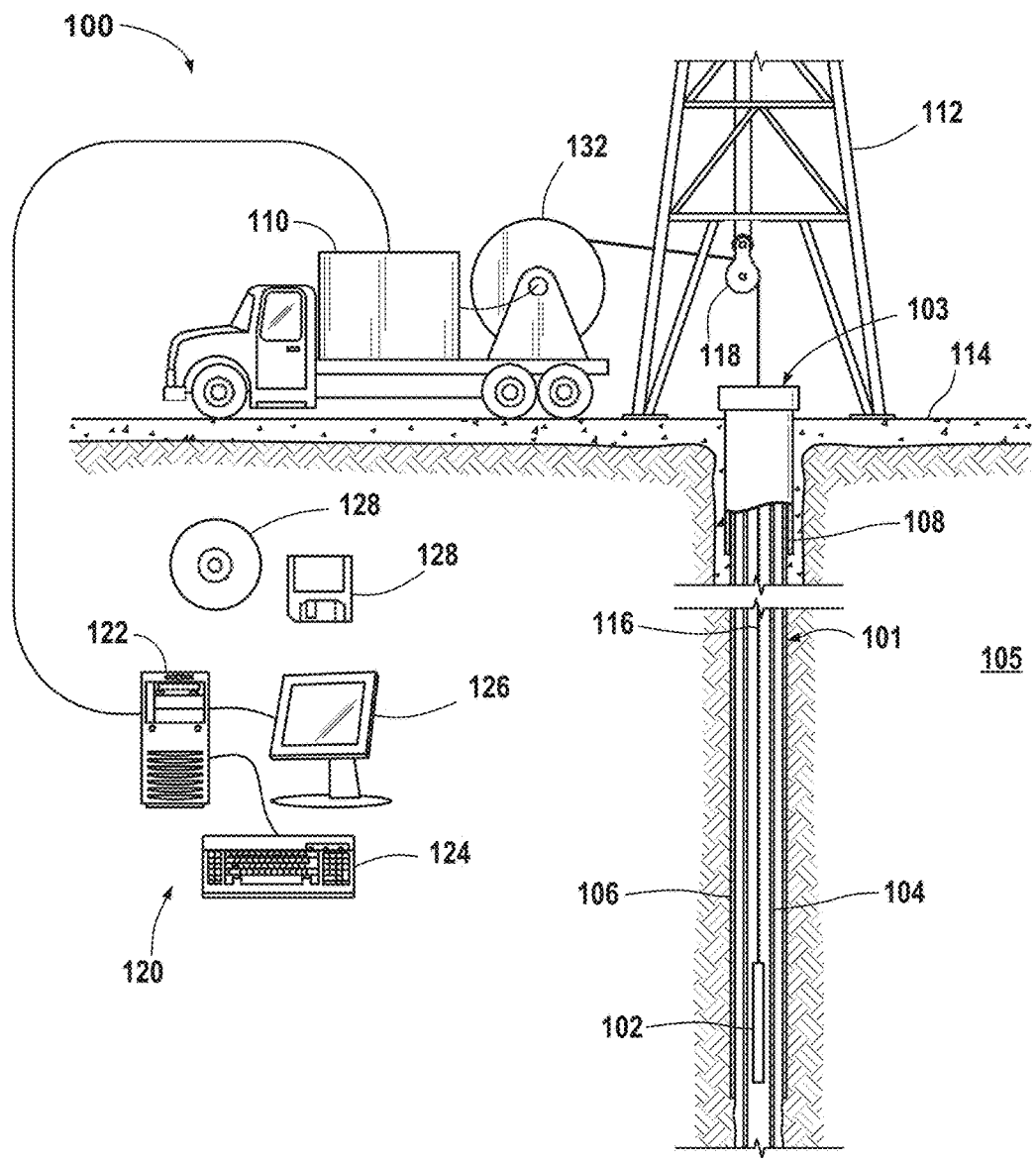
FIG. 1 depicts a schematic diagram of a pipe inspection system, according to one or more embodiments.

FIG. 1 depicts a schematic diagram of a pipe inspection system 100, according to one or more embodiments. In one or more embodiments, the pipe inspection system can be an electromagnetic (EM) well measurements system. However, other well measurements systems or combinations thereof are possible, e.g., nuclear magnetic resonance, acoustic, seismic, pulse neutron, or the like. For example, both acoustic measurements (e.g. for leak detection) and EM measurements can be taken using the pipe inspection system 100. As illustrated, a borehole or wellbore 101 may extend from a wellhead 103 into a subterranean formation 105 from surface 114. Generally, the wellbore 101 may include horizontal, vertical, slanted, curved, and other types of wellbore geometries and orientations. The wellbore 101 may be cased, partially cased, i.e., cased to a certain depth (as shown), or uncased. In one or more embodiments, the wellbore 101 may include one or more metallic tubulars, e.g. pipes, disposed therein. By way of example, the one or more metallic tubulars may be one or more casing, liner, well string, completion string, production tubing, or other elongated steel tubular disposed in the wellbore 101. In one or more embodiments, one or more casing may be disposed in the wellbore 101, e.g. a plurality of casing may be disposed in the wellbore, with at least one casing concentrically disposed in another. As shown, a first casing 106 is concentrically disposed in a second casing 108. The second casing 108 can have a larger diameter than the first casing 106. Though not clearly shown in FIG. 1, the first casing can be radially spaced from the second casing 108 such that an annulus is formed therebetween (see e.g. FIGS. 2-3). Note, although two layers of casing are shown, there can be multiple layers of casing, e.g. 3, 4, 5, 6, or 7 layers of casing. In addition to the casing, in a producing well it is common to have another tubing, e.g. a completion or production string, disposed within the innermost casing. As shown, production tubing 104 is concentrically disposed within the first casing 106. The production tubing 104 can extend into an uncased portion of the wellbore 101.

As illustrated in FIG. 1, the wellbore 101 may extending generally vertically into the subterranean formation 105; however, the wellbore 101 may extend at an angle (although not shown) through the subterranean formation 105, such as horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, the principles described herein are equally applicable to subsea operations that employ floating or sea-based platforms and rigs, without departing from the scope of the disclosure.

The pipe inspection system 100 can include one or more downhole tools disposed on a conveyance 116, which may be lowered into wellbore 101. For example, a downhole tool 102 is disposed on the conveyance 116. As illustrated, the downhole tool 102 is attached to a vehicle 110 via a drum 132. However, in one or more embodiments, it should be noted that the downhole tool 102 may not be attached to the vehicle 110, e.g. being instead attached to a crane or rig. The conveyance 116 and the downhole tool 102 may be supported by a rig 112 at the surface 114.

The downhole tool 102 may be tethered to the vehicle 110 through the conveyance 116. The conveyance 116 may be disposed around one or more sheave wheels 118 to the vehicle 110. The conveyance 116 may include any suitable means for providing mechanical support and movement for the downhole tool 102, including, but not limited to, wireline, slickline, coiled tubing, pipe, drill pipe, downhole tractor, or the like. In some embodiments, the conveyance 116 may provide mechanical suspension as well as electrical connectivity for the downhole tool 102. For example, the conveyance 116 may include, in some instances, one or more electrical conductors extending from the vehicle 110 that may be used for communicating power and/or telemetry between the vehicle 110 and the downhole tool 102.

Information from the downhole tool 102 can be gathered and/or processed by information handling system 120. For example, signals recorded by the downhole tool 102 may be stored on memory and then processed by the information handling system 120. The processing may be performed real-time during data acquisition or after recovery of the downhole tool 102. Processing may occur downhole, at the surface, or may occur both downhole and at surface. In some embodiments, signals recorded by the downhole tool 102 may be conducted to the information handling system 120 by way of the conveyance 116. The information handling system 120 may process the signals and the information contained therein may be displayed, and/or visualized, for an operator to observe and stored for future processing and reference. The information handling system 120 may also contain an apparatus for supplying control signals and power to the downhole tool 102.

Systems and methods of the present disclosure may be implemented, at least in part, with the information handling system 120. The information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the information handling system 120 may be a personal computer, a network storage device, or any other suitable device and may vary in size, shape, performance, functionality, and price. The information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a display 126. The information handling system 120 may also include one or more buses operable to transmit communications between the various hardware components. Although not shown, the information handling system 120 may include one or more network interfaces. For example, the information handling system 120 can communicate via transmissions to and/or from remote devices via the network interface 905 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

Alternatively, systems and methods of the present disclosure may be implemented, at least in part, with non-transitory computer-readable, or machine-readable, media 128. Non-transitory computer-readable media 128 may include any instrumentality or aggregation of instrumentalities that may retain data and/or instructions for a period of time. Non-transitory computer-readable media may include, for example, but not limited to, a system, apparatus, or device, that employs any one of or combination of electronic, magnetic, optical, electromagnetic, infrared, or semiconductor technology to store program code. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other EM and/or optical carriers; and/or any combination of the foregoing. In the context of this document, a computer-readable storage medium may be any tangible medium that can contain or store a program for use by or in connection with an instruction execution system, apparatus, or device. For example, the computer-readable storage medium can comprise program code executable by a processor to cause the processor to perform one or more steps. The computer-readable storage medium can further comprise program code executable by the process to cause or initiate the one or more downhole tools to perform a function, e.g., transmitting a signal, receiving a signal, and/or taking one or more measurements.

The computer-readable media 128 may be a machine-readable signal medium or a machine-readable storage medium. A computer-readable storage medium is not a machine-readable signal medium. A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on computer-readable media 128 may be transmitted using any appropriate medium, including but not limited to wireless, wireline, optical fiber cable, radio frequency (RF), etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine-readable medium that can direct a machine to function in a particular manner, such that the instructions stored in the computer-readable storage medium produce an article of manufacture including instructions which implement the function/act specified in the flowchart and/or block diagram block or blocks.

Figure 2:
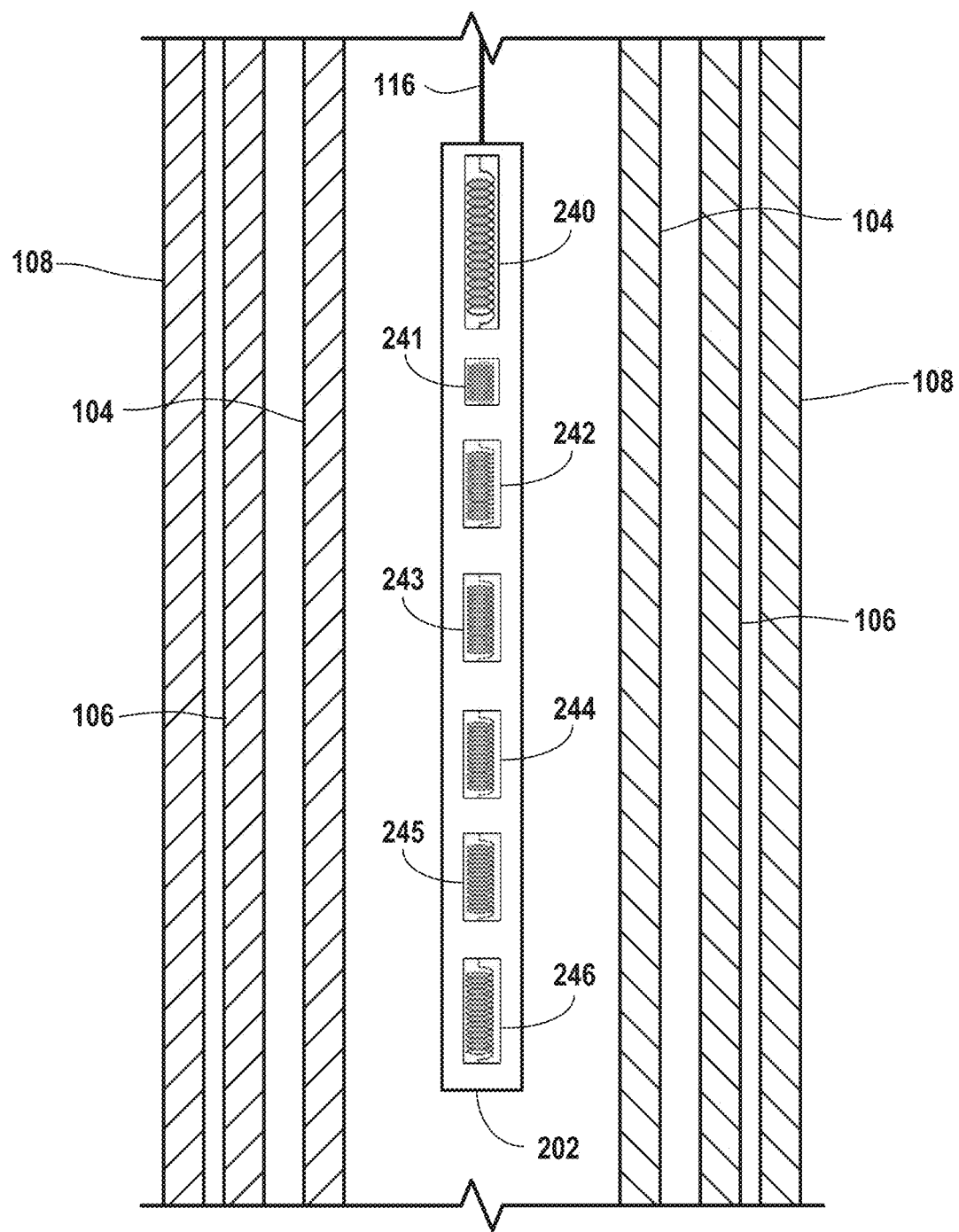
FIG. 2 depicts a cross-sectional view of a frequency-domain tool used for pipe inspection, according to one or more embodiments.
Figure 3:
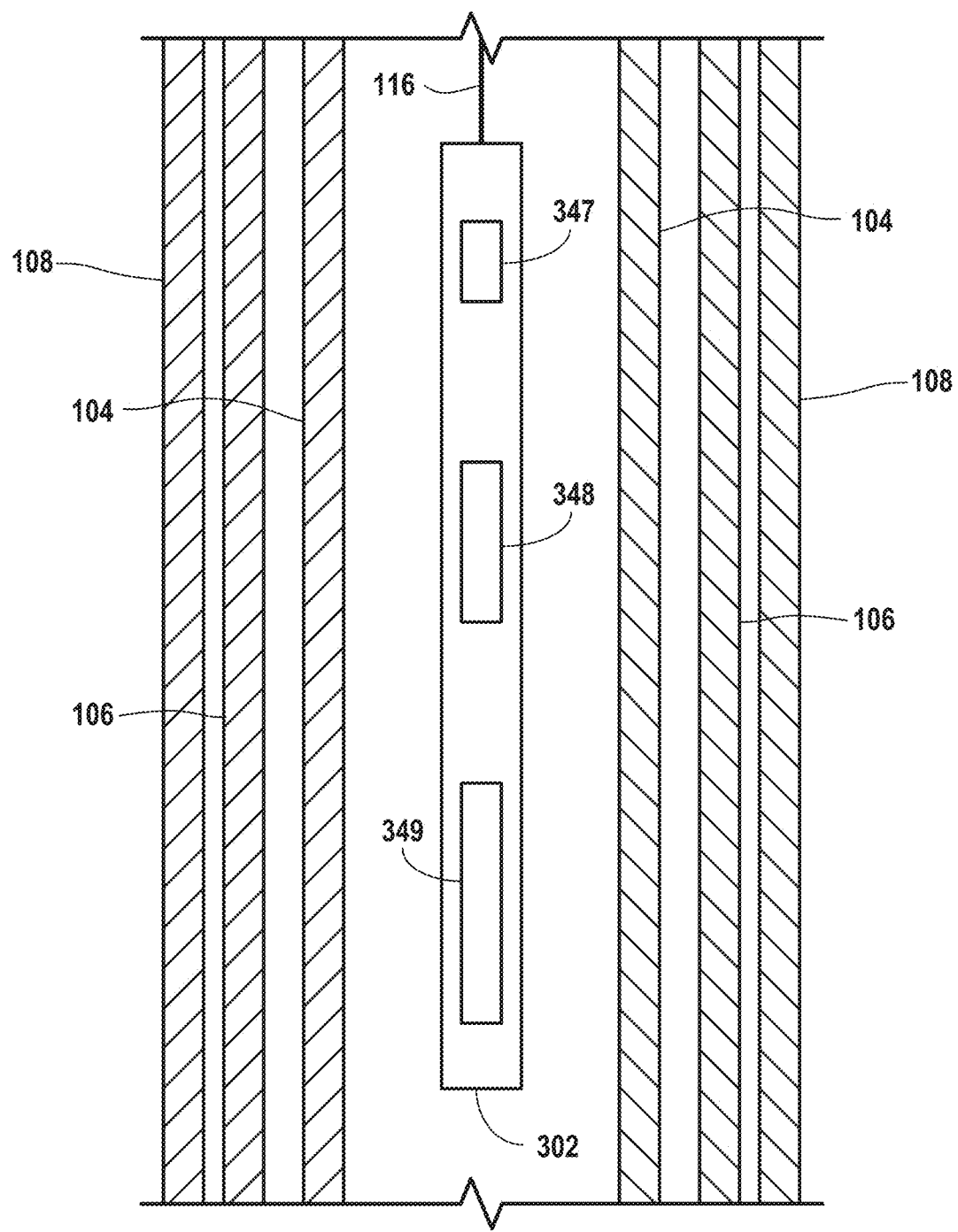
FIG. 3 depicts a cross-sectional view of a time-domain tool used for pipe inspection, according to one or more embodiments.
Figure 4:
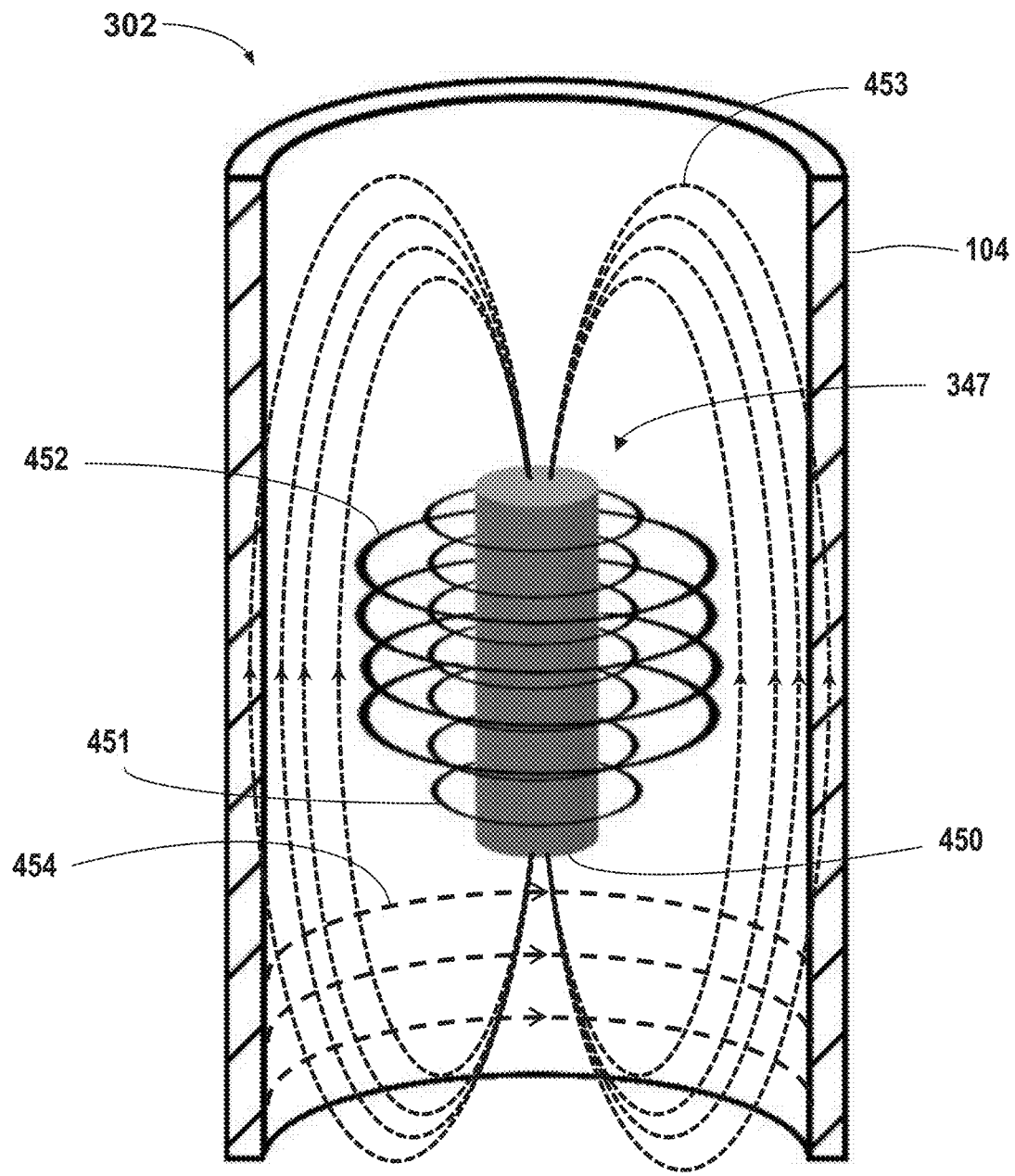
FIG. 4 depicts a partial cross-sectional view of a transceiver of the time-domain tool, according to one or more embodiments.

Turning now to FIGS. 2-4, as one kind of electromagnetic (EM) technique for performing pipe inspection, the eddy current (EC) effect of an EM wave can be applied to develop a tool to characterize the tubulars (e.g. production tubing 104, first casing 106, and second casing 108) around the wellbore 101. The EC techniques can be divided into two categories—frequency-domain EC techniques and time-domain EC techniques.

FIG. 2 depicts a cross-sectional view of a frequency-domain tool 202 used for pipe inspection, according to one or more embodiments. The frequency-domain tool 202 is shown suspended from the conveyance 116 and disposed within multiple nested tubulars (depicted as three layers of tubulars, i.e. production tubing 104, first casing 106, and second casing 108). Although three layers of tubulars, i.e. three layers of nested pipe, are shown, the frequency-domain tool 202 could be deployed in a greater number of tubulars, as mentioned above.

The frequency-domain tool 202 can have one or more transmitters and one or more receivers. In one or more embodiments, the frequency-domain tool 202 has a transmitter 240 and a plurality of receivers spaced apart from each other (six receivers are shown: a first receiver 241, a second receiver 242, a third receiver 243, a fourth receiver 244, a fifth receiver 245, and a sixth receiver 246). In one or more embodiments, each of one or more transmitters and receivers is a coil. The coils can be wrapped around a core. The coils can be axially aligned with the tool 202 or can be tilted coils. The coils can be tri-axial, multiaxial, and/or multi-directional. The one or more transmitter and receivers can be of different sizes and/or of different relative strengths.

In frequency-domain EC techniques, a transmitter coil of the one or more transmitters is fed by a continuous sinusoidal signal, producing primary electromagnetic (EM) fields that illuminate the tubulars. The primary fields produce (or induce) eddy currents in the tubulars. These eddy currents, in turn, produce secondary EM fields that are sensed or measured along with primary fields in the receiver coils of the receivers that are placed at a distance from the one or more transmitters. Characterization of the tubulars is performed by measuring and processing these fields. Measurements by the receivers in frequency-domain tool 202 are performed at different transmitted frequencies, e.g. ranging from 0.1 Hz to 1000 Hz. In one or more embodiments, higher frequencies (e.g. between 0.1 Hz to about 20 HZ) may be used for the inner or innermost tubulars, and lower frequencies (e.g. between 10 Hz and 1000 Hz) may be used for the outermost tubulars. (Note, lower and higher ranges may be varied depending on the tool design and the anticipated tubular spacing.)

In one or more embodiments, the transmitter 240 transmits primary EM fields at one or more frequencies, and at least one receiver of the receivers 241-246 measures at least one of a real-part, imaginary-part, an absolute, or a phase of secondary EM fields, wherein the secondary EM fields are produced from eddy currents induced in the one or more tubulars, by the primary EM fields. In one or more embodiments, more than one transmitter is used. In one or more embodiments, the measurements, i.e. response measurements, by the one or more receivers at each depth is recorded in a log, such as a variable density log (VDL). In one or more embodiments, the log is a multi-frequency, multi-receiver, multi-transmitter log.

FIG. 3 depicts a cross-sectional view of a time-domain tool 302 used for pipe inspection, according to one or more embodiments. Like the frequency-domain tool 202, the time-domain tool 302 is shown suspended from the conveyance 116 and disposed within multiple nested tubulars (depicted as three layers of tubulars, i.e. production tubing 104, first casing 106, and second casing 108). The time-domain tool 302 can have one or more transmitters and one or more receivers. receivers and transmitters of the time-domain tool 302 are co-located. In one or more embodiments, the For example, the time-domain tool 302 can have one or more transmitter-receiver pairs, i.e. transceivers, spaced along the axial direction of the tool body of time-domain tool 302 (three transceivers, first transceiver 347, second transceiver 348, and third transceiver 349, are shown). In one or more embodiments, the transmitter(s) and receivers of the time-domain tool 302 are not co-located, with the receiver(s) spaced apart from the transmitter(s).

In time-domain EC techniques (also referred to as pulsed EC), the transmitter of each transmitter-receiver pair sends out transient fields, which can produce eddy currents in the tubular(s). The eddy currents then produce secondary magnetic fields that are measured by either a separate receiver coil placed further away from the transmitter or a separate coil co-located with the transmitter.

FIG. 4 depicts a partial cross-sectional view of a transceiver (the first transceiver 347 is shown) of the time-domain tool 302, according to one or more embodiments. As shown, the first transceiver 347 is disposed in the production tubing 104. The first transceiver 347 has a transmitter coil 451 and receiver coil 452 both wrapped around a magnetic core 450. The receiver coil 452 is co-located with the transmitter coil 451. The transmitter coil 451 emanates a transient magnetic field 453. The transient magnetic field 453 produces eddy currents 454 in the production tubing 104. The eddy current 454 produce secondary magnetic field (not shown, but parallel with the transient magnetic field) that is measured by the receiver coil 452. The strength of the secondary magnetic field decays versus time, and a decay response is measured by the receiver coil 452 after the transmitter coil 451 is turned off. The strength of the response at different times, i.e. time bins, is sensitive to parameters of the different nested tubulars. For example, early times are more sensitive to the innermost tubular, e.g.

the production tubing 104, whereas later times are sensitive to both the inner and outer tubulars, e.g. production tubing 104, the first casing 106, and the second casing 108. The decay response, i.e. samples with different time delay, is thus indicative of the tubular integrity property of the tubulars.

The eddy current 454 measured by the receiver coil 452, i.e., a received signal, is proportional to the amount of metal that is around transmitter coil 451 and the receiver coil 452. For example, less signal magnitude is typically an indication of more metal, and more signal magnitude is an indication of less metal. This relationship may be utilized to determine metal loss, which may be due to an abnormality or defect related to the tubular, e.g. due to corrosion or buckling. The received signal, i.e. the measured eddy current, can be recorded as a log.

Figure 5:
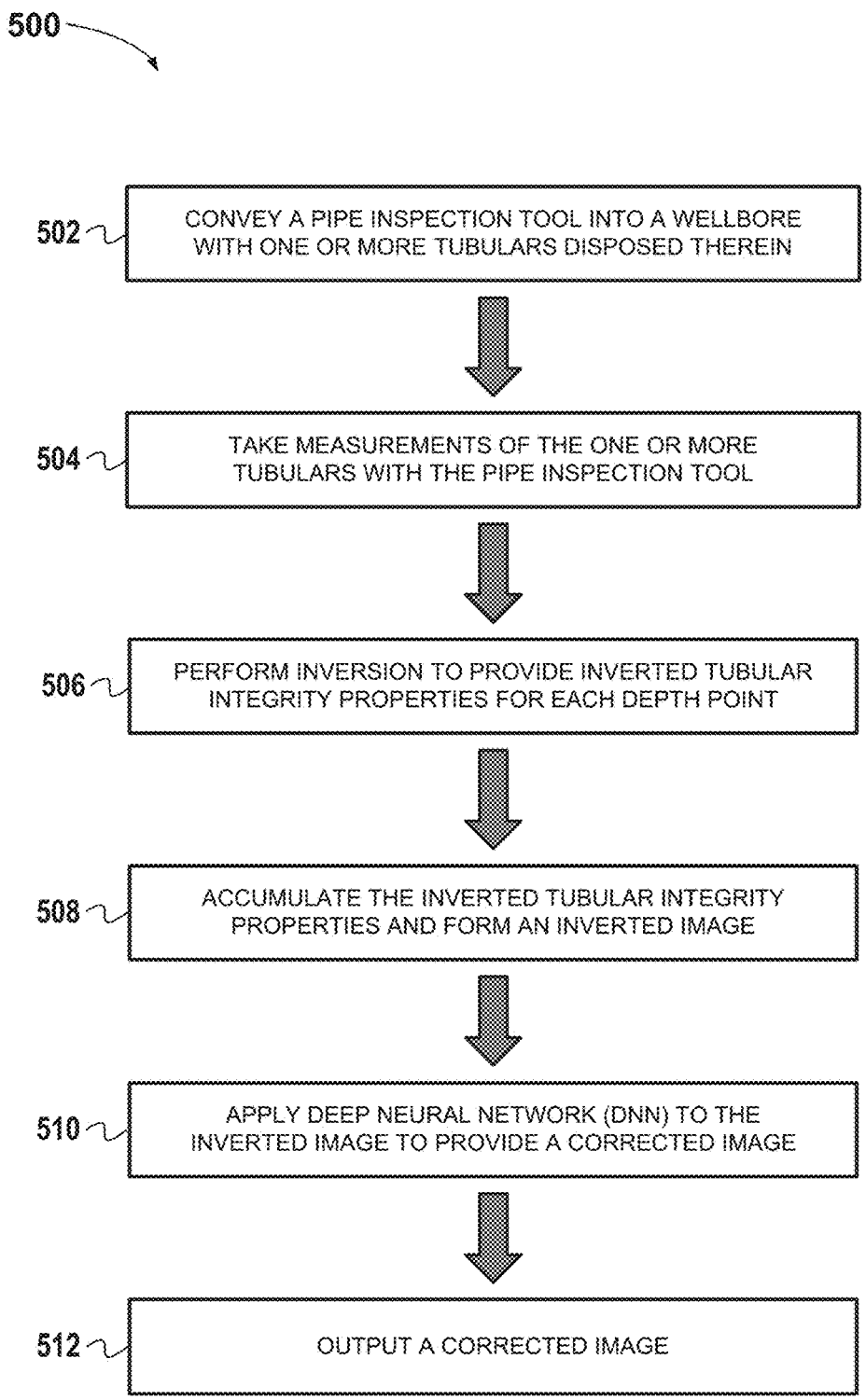
FIG. 5 depicts a flowchart of a machine learning based method for pipe inspection, according to one or more embodiments.

FIG. 5 depicts a flowchart of a machine learning based method 500 for pipe inspection, according to one or more embodiments. At 502, an electromagnetic pipe inspection tool (e.g. the downhole tool 102, the frequency-domain tool 202, or the time-domain tool 302) is disposed into a wellbore (e.g. wellbore 101) having one or more tubulars disposed therein (e.g. production tubing 104, first casing 106, and second casing 108, or more tubulars). In one or more embodiments, the one or more tubulars are multiple nested tubulars, and the pipe inspection tool is disposed, e.g. conveyed via a conveyance, inside an inner most tubular of the multiple nested tubulars.

At 504, measurements of the one or more tubulars are taken with the pipe inspection tool, e.g. via one or more receivers. For example, a transmitter (e.g. the transmitter 240 or a transmitter in one of the transceivers 347-349) can produce a current (as described above with the two different types of tools) that is measured by one or more receivers (e.g. the receivers 241-246 or the receivers of the transceivers 347-349). These measurements taken over depth are the response, i.e. raw measurements over depth. The initial measured response can be output as a log of raw measurements for each receiver. In one or more embodiments, the measurements taken are initiated by one or more non-transitory machine-readable media comprising program code for inspecting the integrity of multiple nested tubulars.

In a frequency-domain tool, one or more transmitters transmit EM fields at multiple frequencies. The frequency-domain tool measures, at each receiver, at least one of the real-part, imaginary part, the absolute (i.e. the magnitude), the amplitude, or the phase of the current produced by the one or more transmitters at each of the multiple frequencies. In a time-domain tool, one or more transmitters excite the one or more tubulars with a pulsed EM field. The time-domain tool measures, at each receiver, the decay response of the pulses in the time-domain. The decay response measured by the one or more receivers, e.g. multiple receivers, includes multiple time delays.

In addition to operating in either the frequency-domain or the time-domain, the pipe inspection tool can be configured to operate in at least two different ways: as an omnidirectional tool or as a directional (e.g. azimuthal) tool. In an omnidirectional tool, the raw signal received represents the total signal at depth, i.e. not a signal that is azimuthally sensitive. In a directional tool, the signal received only represents a single direction, e.g. an azimuthal bin. Azimuthal measurements can be taken through a variety of different ways at depth. For example, the transmitter and/or the receiver can be titled antennas. In another example, the transmitter(s) and or receivers can be tri-axial, multi-directional, and/or multi-axial coils. In yet another example, one or more shields, e.g. one that blocks or limits transmission of EM waves, can rotate only allow transmission or receipt of a signal in a particular azimuthal angle. In the directional tool, azimuthal measurements of the nested tubulars are taken with the pipe inspection tool.

For a frequency-domain tool, measurements over depth for each receiver at each frequency can form a log for each receiver. In at least one example, the log has depth on the Y axis, frequency bands on the X axis, and color/greyscale/brightness gradient representing the difference from a nominal value (the nominal value determined via calibration). "Depth" here refers to an axial measurement of depth along the axis of the tubular(s), sometimes referred to as "measured depth" or "logging depth". In other examples, the frequency component can be logged in a different manner, e.g. as a magnitude at each depth. Each measurement at each depth and frequency is mapped to a log data point on the log to form the log for each receiver. The log data point can also be a line perpendicular to the Y-axis, i.e. instead of a single point.

In one or more embodiments, each log of each receiver forms a channel in the 2D response image, such that the 2D response image represents multiple channels. For example, the logs from multiple receivers and multiple frequencies can be juxtaposed to form the 2D response image. The 2D response image is a reflection of how much each channel changes, e.g. how the channel's response varies from a nominal or expected value, when it encounters a feature, i.e. an anomaly or defect in at least one of the tubulars, at a particular depth. For the frequency-domain response image, a first dimension of the 2D response image is the depth and a second dimension is the channels of different receivers. In one or more embodiments, each log data point is represented by a pixel in the 2D image, and a value assigned to each pixel in the 2D response image is proportional to a percentage change of each log data point from a nominal value of that log data point. For example, in the 2D response image the pixel value can be displayed as a color, gray scale, or brightness (e.g. based on a numeric scale) and can represent a difference (e.g. a percentage difference) of the frequency, e.g. the frequency magnitude, from the nominal value of that pixel.

For a time-domain tool, a decay response is measured by the multiple receivers comprises multiple samples with different time delays. Measurements over depth for each receiver of the multiple receivers, e.g. the measurements of a secondary magnetic field at each depth and at each time sample of the multiple time samples, form a log for each receiver. In at least one example, the log has depth on the Y axis, time increments on the X axis, and color/greyscale/brightness gradient representing the difference in the decay response from a nominal value (the nominal value determined via calibration) at the particular time increment. Each measurement at each depth and time is mapped to a log data point on the log to form the log for each receiver. The log data point can also be a line perpendicular to the Y-axis, i.e. instead of a single point.

In one or more embodiments, each log of each receiver in the time-domain tool forms a channel in the 2D response image, such that the 2D response image represents multiple channels. For example, the logs from multiple receivers and multiple time bins sampling the decay response can be juxtaposed to form the 2D response image. The 2D response image is a reflection of how much each channel changes, e.g. how the channel's response varies from a nominal or expected value, when it encounters a feature, i.e. an anomaly or defect in at least one of the tubulars, at a particular depth. For the time-domain response image, a first dimension of the 2D response image is the depth and a second dimension of the 2D response image is the decay response returned by the tubulars. In one or more embodiments, each log data point is represented by a pixel in the 2D image, and a value assigned to each pixel in the 2D response image is proportional to a percentage change of each log data point from a nominal value of that log data point. For example, in the 2D response image for the time-domain tool the pixel value can be displayed as a color, gray scale, or brightness (e.g. based on a numeric scale) and can represent a difference (e.g. a percentage difference) of the decay response with respect to the nominal value of that pixel.

For a directional tool, the measurements taken in each direction, e.g. each azimuthal bin or each azimuthally placed receiver, can be arranged into, i.e. accumulated to form, a three-dimensional (3D) response image, i.e. a 3D representation of the tool response. The directional tool can operate in the frequency domain or in the time domain. The 3D response image is a 3D representation of the tool response wherein a first dimension is depth, i.e. measured depth, a second dimension is azimuth, and a third dimension is a juxtaposition of measurements from multiple receivers and either multiple frequencies, for a frequency-domain tool, or time delay, for a time-domain tool, at a given depth point and angular direction.

At 506, an inversion is performed on log data from the measurements of the receivers to provide inverted tubular integrity properties for each tubular at each depth point. The inversion is applied point-by-point to estimate nested pipe properties, e.g. tubular integrity properties such as magnetic permeability, electrical conductivity, thicknesses, eccentricity, etc., from the measurements. The inversion starts from an initial guess of model parameters (e.g. thickness, outer diameter (OD), conductivity, relative permeability, etc.) or each tubular and iteratively updates the model parameters to minimize a misfit (i.e. cost function) between the measurements and predicted parameters generated using a forward model. In one or more embodiments, the forward model is a radial one-dimensional (IUD) model. 2D or 3D models can be used as well. The inversion can make use of a forward solver to generate synthetic data and compare it to the measurements. The forward model is executed repeatedly until a satisfactory match, i.e. the misfit error is below a threshold, between the predicted model parameters and the measurements for the entire log. The result of the inversion is an inverted tubular integrity property for each tubular at each depth.

At 508, the inverted tubular integrity properties for each depth point are accumulated to form an inverted image. In one or more embodiments, the inverted tubular integrity properties for each depth point is accumulated in a buffer. When sufficient inverted tubular integrity properties have been collected in the buffer, a fixed size image can be formed, with each inverted tubular integrity properties making up pixels of the inverted image. In one or more embodiments, a value is assigned to each pixel of the inverted image is proportional to a percentage change of the tubular integrity property of each of the individual tubulars of the multiple nested tubulars from a nominal tubular integrity property of each of the individual tubulars of the multiple nested tubulars as determined by the inversion.

For an omnidirectional tool, the inverted image can be a two-dimensional (2D) inverted image, having depth on one axis (e.g. the Y-axis), the number of tubulars of the multiple nested tubulars a second axis (e.g. the X-axis), and a metal loss percentage for each tubular at each depth point shown as gradient value difference from a nominal value. For example, each X-Y pixel can have color or shade representing whether the metal loss percentage is nominal, below nominal (e.g. indicating metal loss), or above nominal (e.g. indicating a collar or other widened portion of the tubular).

For a directional, e.g. azimuthal tool, the inverted image can be a three-dimensional (3D) inverted image. In one or more embodiments, the 3D inverted image has depth as a first dimension, azimuth as a second dimension, and inverted tubular integrity properties as a third dimension. The 3D inverted image can display the multiple nested pipes in 3D with gradient in each tubular representing a difference in between a nominal value of a tubular's tubular integrity property and the inverted tubular integrity property (i.e. the estimated tubular integrity property of each individual tubular), the gradient indicating the estimated metal loss percentage, solved for via the inversion at the particular depth and azimuth of the particular tubular.

At 510, a deep neural network (DNN) is applied to the inverted image, e.g. the 2D inverted image from an omnidirectional tool or the 3D inverted image from the directional tool, to provide, i.e. output, a corrected image. In one or more embodiments, the inverted image is fed to a pre-trained DNN to produce one or more corrected images representative of a corrected tubular integrity property of each individual tubular of the multiple nested tubulars. In one or more embodiments, the inverted image is split into sections based on depth, and each section is separately and/or sequentially fed to the DNN. Herein, a neural network is considered "deep" when a network has a plurality of layers, i.e. more than three layers. For example, a DNN has at least in input layer, an output layer, and one or more hidden layers, e.g. multiple hidden layers. In one or more embodiments, the DNN has at least one convolutional layer. A DNN with at least one convolutional layer is hereafter referred to as a convolutional neural network (CNN). A convolutional layer is defined as a layer in a neural network that implements a convolution. A convolution can include a cross-correlation. In one or more embodiments, the DNN is not a conventional DNN. The CNN can include one or more convolutional layers plus one or more fully connected layers, one or more pooling layers (e.g. local, global, max, or average pooling), one or more up-sampling layers, one or more dense layers, one or more concatenation layers, one or more summation layers, and/or other available layers used in CNNs. The learning in the CNN can be done at multiple levels, e.g. using microscope to capture fine details and telescope to see a bigger picture, to find both small and big errors.

The CNN can correct errors existing in the inverted image. For example, inversion artifacts can arise in the inverted image from limitations of the inversion model, e.g. inversion artifacts can be introduced by the R1D inversion model, because of one dimensional model mismatch with the two-dimensional or even three-dimensional features of the true, i.e. real, tubular configurations or features. Artifacts that are corrected by the CNN can include limited vertical resolution of the RID inversion, artifacts due to collars in the tubulars, and artifacts due to eccentricity and/or ovality of the tubulars. The artifacts can appear in the inverted image as anomalies and can be very noticeable when compared to a true image for overlapped anomalies. Other artifacts in the inverted image may arise when a width of a defect in one of the tubulars is small and below tool resolution, i.e. the measurement resolution of the pipe inspection tool, and the inversion algorithm is not able to provide a good inversion of the defect thickness or another tubular integrity property.

Other artifacts that can be corrected include spikes in a contaminated region, e.g. when a particular channel is noisy.

Figure 6:
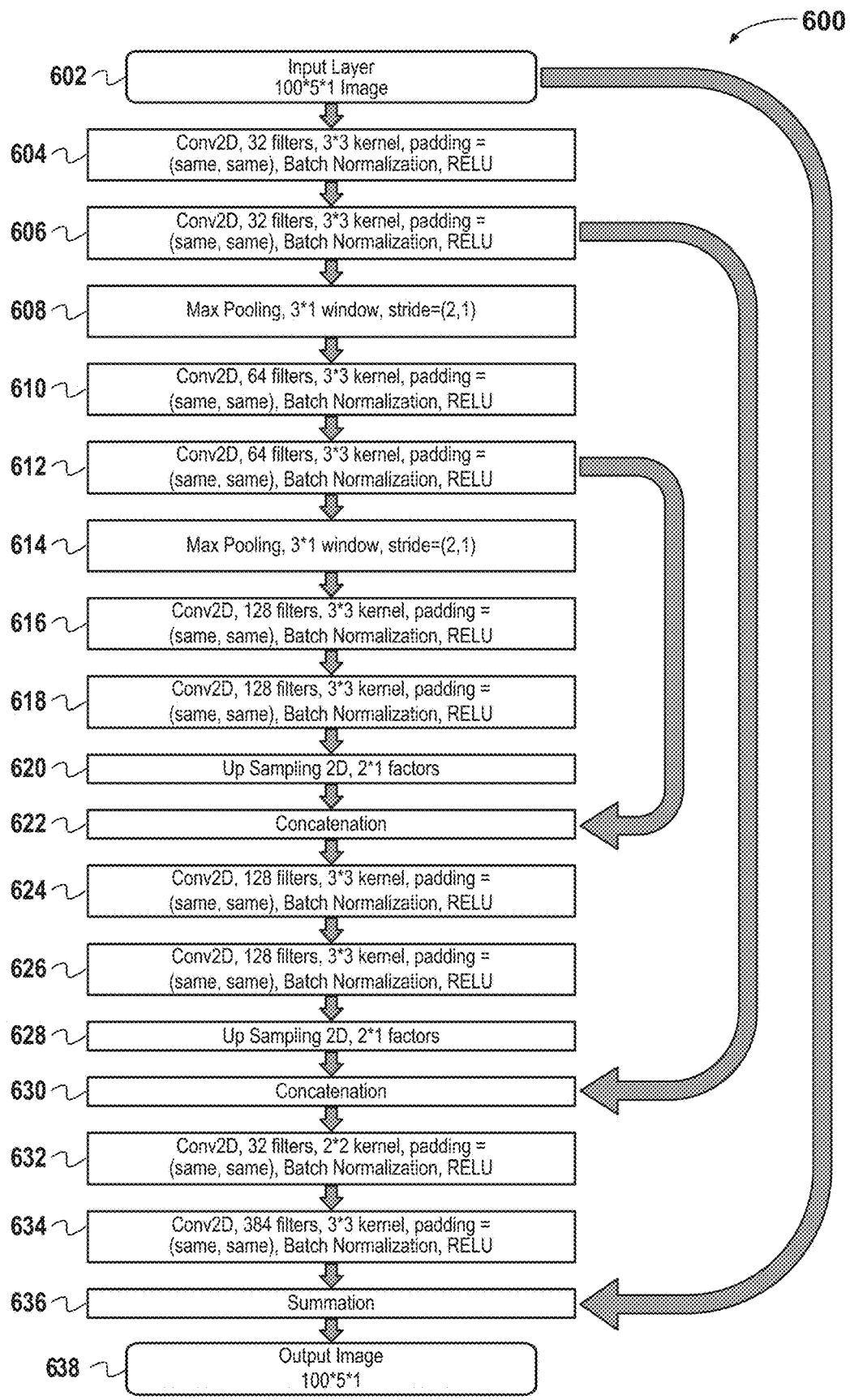
FIG. 6 depicts an example of a first architecture of a deep neural network (DNN) having at least one convolutional layer, according to one or more embodiments.

FIG. 6 depicts an example architecture 600 of a DNN having at least one convolutional layer (i.e. a CNN), according to one or more embodiments. In the architecture 600, the size of the input image, e.g. the 2D inverted image or the 3D inverted image, is M*K*P, where M is the number depth points (points over depth where inverted tubular integrity properties are recorded), K is the number of individual tubular integrity properties, i.e. the number of tubulars or pipes, and P is the number of channels for each tubular. In the example shown by the architecture 600, an input layer 602 takes an inverted image where M=100, K=5, P=1. The size of output image, e.g. the corrected image, is M*K, i.e. similar to the inverted image input to the CNN. The individual tubular integrity properties can be also referred to as the tubular integrity property parameters. In the example shown by the architecture 600, at an output layer 638, a corrected image is output where M=100 and K=5, i.e. the output image has 100 depth points and 5 individual tubular integrity properties for 5 tubulars.

Between the input layer 602 and the output layer 638 are 17 layers, i.e. 17 hidden layers, 604-636. Although 17 layers are shown in this example architecture 600, there could be only 1 hidden layer, between 2 and 16 hidden layers, or more than 17 hidden layers. A first hidden layer 604 is a first convolutional layer, e.g. a 2D convolutional layer ("Conv2D") with one or more 2D filters (i.e. one or more convolutional filters), with padding and batch output applied and having a RELU activation function. The first convolutional layer has 32 filters with a 3*3 kernel. A second hidden layer 606 is a second convolutional layer with padding and batch output applied and having a RELU activation function. The second convolutional layer also has 32 filters with a 3*3 kernel. A third hidden layer 608 is a first max pooling layer with a 3 by 1 window size in the windows first and second dimension, respectively, and a stride of 2 and 1 in the first and second dimension, respectively.

A fourth hidden layer 610 is a third convolutional layer with padding and batch output applied and having a RELU activation function. The third convolutional layer has 64 filters with a 3*3 kernel. A fifth hidden layer 612 is a fourth convolutional layer with padding and batch output applied and having a RELU activation function. The fourth convolutional layer has 64 filters with a 3*3 kernel. A sixth hidden layer 614 is a second max pooling layer with a 3 by 1 window size in the windows first and second dimension, respectively, and a stride of 2 and 1 in the first and second dimension, respectively. A seventh hidden layer 616 is a fifth convolutional layer with padding and batch output applied and having a RELU activation function. The fifth convolutional layer has 128 filters with a 3*3 kernel. An eighth hidden layer 618 is a sixth convolutional layer with padding and batch output applied and having a RELU activation function. The sixth convolutional layer has 128 filters with a 3*3 kernel.

A ninth hidden layer 620 is a first up sampling layer. The ninth hidden layer 620 applies an up-sampling operation by a factor of 2 in a first dimension and a by a factor of 1 in a second dimension. A tenth hidden layer 622 is a first concatenation layer. The tenth hidden layer 622 concatenates the output, e.g. in the form of an image, of the fifth hidden layer 612 with output, e.g. in the form of an image, of the ninth hidden layer 620 in a third dimension. An eleventh hidden layer 624 is a seventh convolutional layer with padding and batch output applied and having a RELU activation function. The seventh convolutional layer has 128 filters with a 3*3 kernel. A twelfth hidden layer 626 is an eighth convolutional layer with padding and batch output applied and having a RELU activation function. The eighth convolutional layer has 128 filters with a 3*3 kernel.

A thirteenth hidden layer 628 is a second up sampling layer, applying an up-sampling operation by a factor of 2 in a first dimension and a by a factor of 1 in a second dimension. A fourteenth hidden layer 630 is a second concatenation layer. The fourteenth hidden layer 630 concatenates the output, e.g. in the form of an image, of the second hidden layer 606 with output, e.g. in the form of an image, of the thirteenth hidden layer 628 in the third dimension. A fifteenth hidden layer 632 is a ninth convolutional layer with padding and batch output applied and having a RELU activation function. The ninth convolutional layer has 32 filters with a 2*2 kernel. A sixteenth hidden layer 634 is a tenth convolutional layer with padding and batch output applied and having a RELU activation function. The tenth convolutional layer has 384 filters with a 3*3 kernel. A seventeenth hidden layer 636 is a summation layer. The seventeenth hidden layer 636 sums the input image with the output image of the sixteenth hidden layer 634 in the third dimension. The seventeenth hidden layer 636 feeds into the output layer 638 described above to provide the corrected image.

The example architecture 600 is just one way of constructing a DNN with one convolutional layer, i.e. constructing a CNN. Other configurations can be used for different input sizes or different processing. For example, although not shown in FIG. 6, the convolutional filters in one or more of the convolutional layers can be a 3D filter instead of a 2D filter. The 3D filter can be used, for example, when the DNN is fed a 3D inverted image from a directional tool. In another example, one or more concatenation layers, e.g. to concatenate two images is a third dimension, or one or more summation layers, e.g. to sum two images is a third dimension, and one or more up-sampling layers can be used. Further, different numbers of convolutional, pooling, and fully connected layers can be used, as well as different parameter settings for each layer shown and any different layers added.

Referring again to FIG. 5, at 512, the method 500 can output the corrected image. For example, the corrected image can be displayed, recorded, printed, or fed to another method. The corrected image includes a representation of a corrected tubular integrity property of each individual tubular of the multiple nested tubulars. For example, the corrected image can include a representation of at least one of the cross-sectional thickness, magnetic permeability, and electrical conductivity of each individual tubular of the multiple nested tubulars. Other parameters of the tubulars can also be included in the corrected image, such as eccentricity, ovality, or the like. The corrected image is made up of pixels. In one or more embodiments, a value is assigned to each pixel of the corrected image is proportional to a percentage change of the tubular integrity property of each of the individual tubulars of the multiple nested tubulars from a nominal tubular integrity property of each of the individual tubulars of the multiple nested tubulars.

The corrected image can include the location of the defects in the multiple nested tubulars and noted variance of the tubular integrity property of the individual tubulars, and thereby can provide a report of the integrity of the multiple nested tubulars. For example, when the tubular integrity property is cross-sectional thickness, the corrected image can highlight where the cross-sectional thickness is below a nominal value, including how severely below the nominal value. As such, the whole method is considered an inspection of the integrity of the multiple nested tubulars.

FIG. 5 is annotated with a series of numbered blocks 502-512. These numbered blocks represent stages of operations. Although these stages are ordered for this example, the stages illustrate one example to aid in understanding this disclosure and should not be used to limit the claims. Subject matter falling within the scope of the claims can vary with respect to the order and some of the operations.

Figure 7:
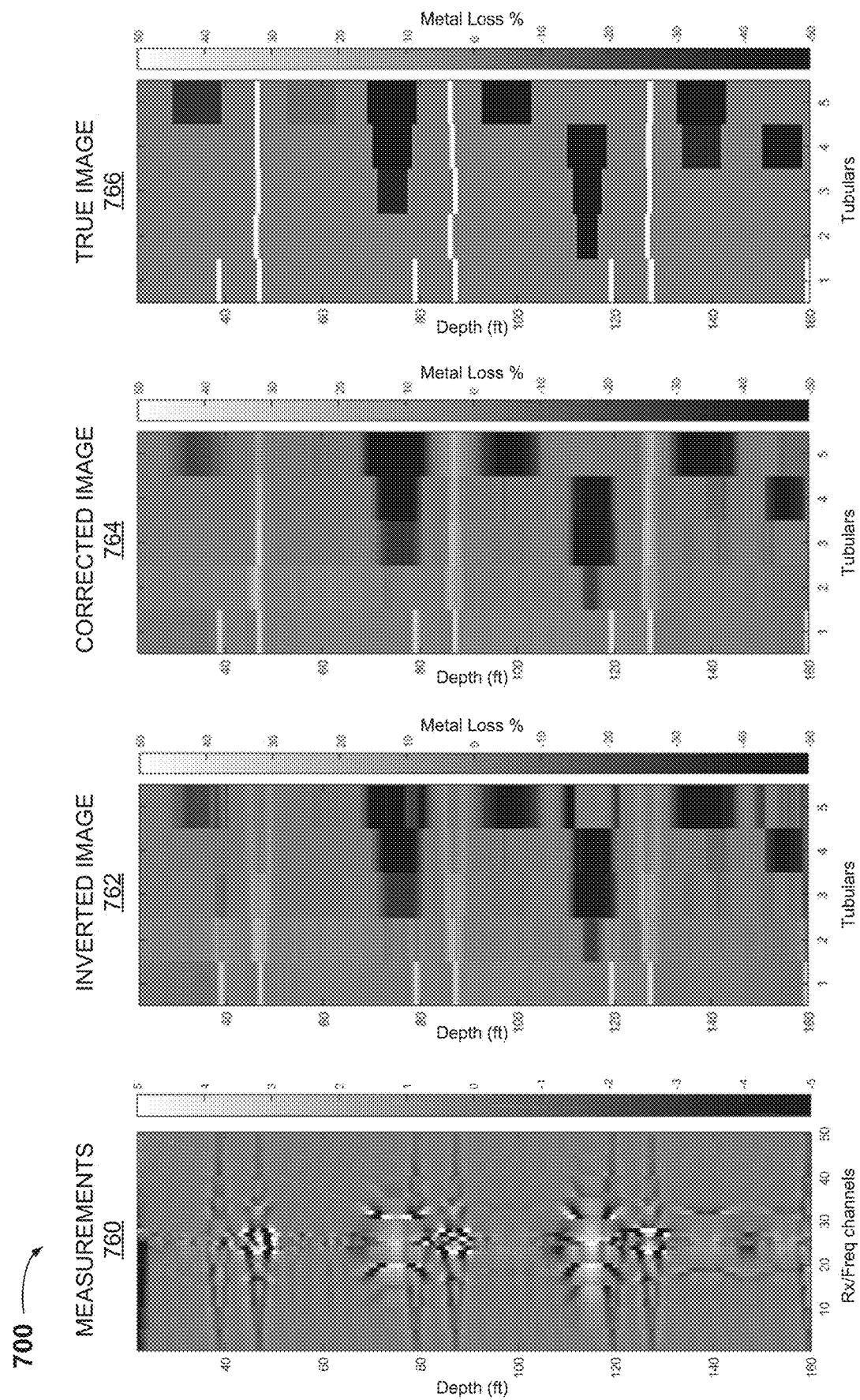
FIG. 7 illustrates an example of tubular thickness estimation using a convolutional neural network (CNN), according to one or more embodiments.

FIG. 7 illustrates an example of tubular thickness estimation 700 using a pre-trained CNN, according to one or more embodiments. Although the estimation 700 focuses on thickness, the same technique could be applied for any tubular integrity property. For this example, a controlled test, e.g. a yard test, was performed using a set of five nested tubulars, i.e. concentric pipes. The five nested tubulars had outer diameters (OD) of 18⅝ inches ("), 13⅜", 9⅝", 7", and 2⅞", respectively, with the 2⅞" OD tubing being the innermost tubular and the 18⅝" OD tubing being the outermost tubular. Several defects were machined on each one of the five nested tubulars. Some of the defects were overlapping and others were not. In addition, the defects had different axial lengths ranging from 2 feet (ft) to 10 ft, and the defects had different metal loss ranging from 7.6% to 65%, with respect to nominal thickness. The details of the five nested tubulars is shown in the true image 766 having depth shown on the Y axis and the number of tubulars shown in the X axis. The metal loss percentage for each tubular at each depth point is shown as a greyscale gradient spanning from 50 to negative 50, with 0 representing nominal tubular thickness. The positive pixel values in the true image, shown as the lightest color or shade, show the location of pipe collars on each tubular, as the collars have a tubular thickness greater than the nominal tubular thickness. As shown, the 2⅞" OD tubing (the first or innermost tubular) has seven pipe collars (represented by the seven horizontal light lines) but no defects. The rest of the tubulars each have three collars and varying defects (represented by the darker colored pixel values, with the darkest color representing the highest metal loss percentage). For example, 18⅝" OD tubing (the fifth and outermost tubular) has three collars and five defects of varying metal loss percentage.

The raw measurements of the five nested pipes with an omnidirectional tool are shown in as measurements 760. The measurements can be represented in various ways. In one or more embodiments, the measurements 760 can be formed into a response image as shown, i.e. a 2D response image, having depth on the Y axis, frequency channels on the X axis, and a greyscale gradient representing the difference in the frequency from a nominal value. As depicted in response image visualizing the measurements 760, the nominal value of the gradient is 0, the high frequency value is 5, and the low frequency value is –5. The difference in frequency can be scaled to match the gradient. As shown, some points are above the nominal value, represented by a lighter shade, and some points are below the nominal value, represented by a darker shade. In one or more embodiments, the measurements, e.g. impedance, i.e. a ratio of voltage to current, are recorded without forming a response image, e.g. recorded as a log per depth for each receiver.

The tubular thickness estimation 700 in the example then applied the method 500. An inversion was applied to the measurements 760 to provide the inverted image 762 having inverted thicknesses. The inverted image 762 is representative of an estimated cross-sectional thickness of each individual tubular of the five nested tubulars. As mentioned above, inversion can introduce one or more artifacts in the inverted image 762. For example, between about 110 ft and about 120 ft, one or more artifacts are visible in the fifth tubular, i.e. the tubular furthest from the tool in a radial direction. As the darker shade in the inverted image 762 indicates a higher percentage these artifacts could falsely indicate metal loss between about 110 ft and about 120 ft in the fifth tubular. Another similar artifact in the inverted image 762 is present at about 150 ft of the fifth pipe.

The inverted image 762 was fed to the pre-trained CNN (a pre-trained DNN having at least one convolutional layer) to produce a corrected image 764 representative of a corrected cross-sectional thickness of each individual tubular of the multiple nested tubulars. The corrected image 764 can also be referred to as a CNN-enhanced image. The corrected image 764 can have the inversion artifacts of the inverted image 762 removed or minimized. Further, the corrected image 764 refined and/or sharpened features of the image. For example, the corrected image 764 clarified collar locations and more accurately represented defect edges and lengths, see e.g. the defect at about 70 ft to about 80 ft and the representation in the inverted image versus the corrected image. The corrected image 764 is juxtaposed in FIG. 7 next to the true image 766, having the same axes and greyscale gradient. Note, while the greyscale gradient for any of the images could also be a color scale or the like. As depicted, a value is assigned to each pixel of the corrected image is proportional to a percentage change of each of the cross-sectional thicknesses of each of the individual tubulars of the five nested tubulars from a nominal cross-sectional thickness of each of the individual tubulars of the five nested tubulars. The example demonstrated that the corrected image 764 accurately depicted both the collars and the defects present in the true image 766, providing an improvement over the inverted image 762.

Figure 8:
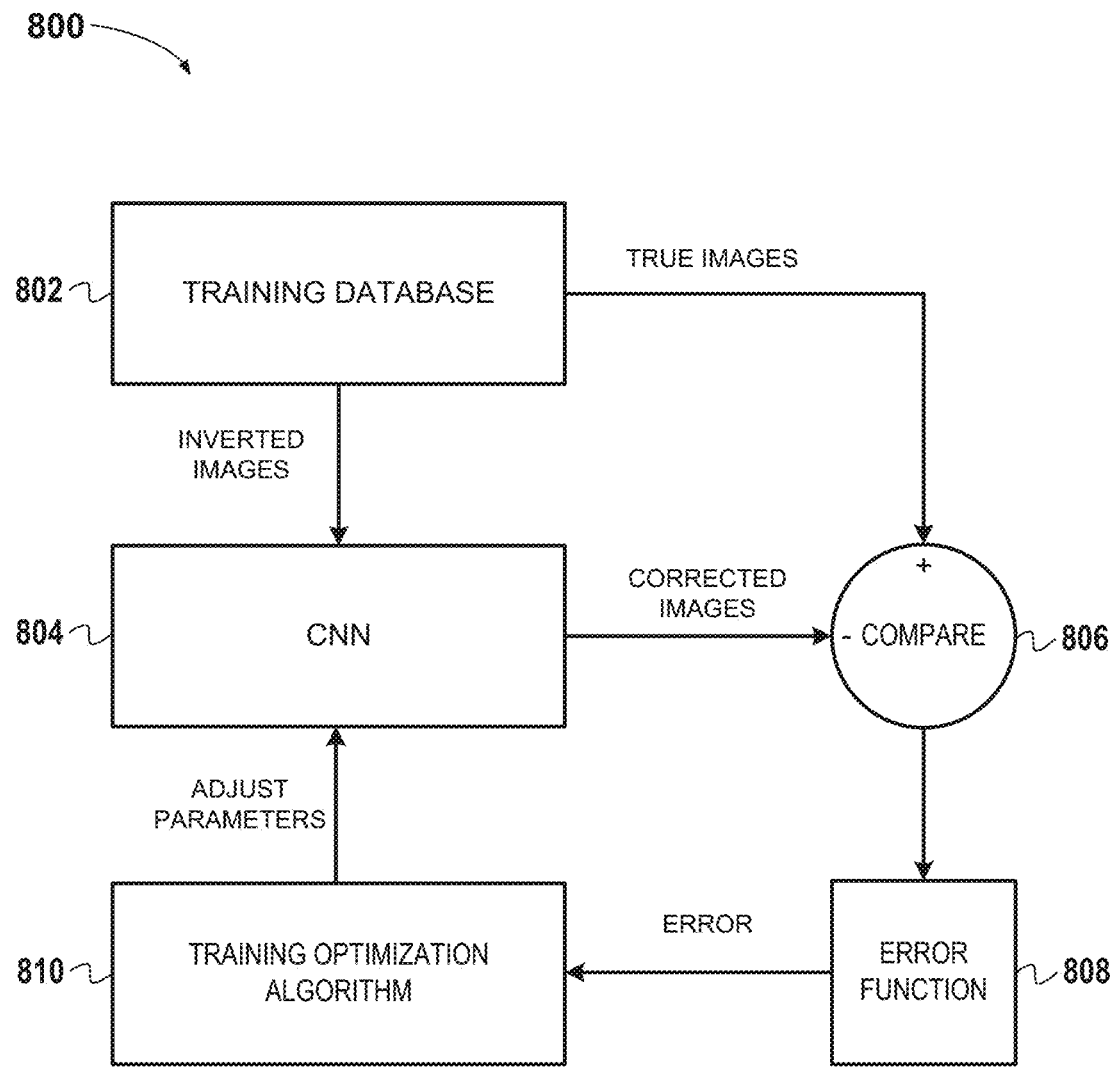
FIG. 8 depicts a flowchart of a method for training a DNN having at least one convolutional layer, according to one or more embodiments.

FIG. 8 depicts a flowchart of a method 800 for training a DNN having at least one convolutional layer, according to one or more embodiments. In one or more embodiments, the DNN with at least one convolutional layer, e.g. CNN 804, is be pre-trained. Training the DNN begins with building a training database 802 using at least one of simulation or measurements of known cases. The training database 802 is built with a plurality of samples. Each sample of the plurality of samples includes a true image of individual tubular integrity properties of one or more nested tubulars and a corresponding inverted image. Both the true image and the inverted image used for the sample are for a corresponding number of depth points. For example, a sample can be obtained using simulations, e.g. simulated inverted images for a simulated true image of a simulated set of one or more tubulars. A sample can also be obtained by inverting raw measurements of known case, i.e. by recording raw response images based on real measurements for multiple nested tubulars and applying an inversion thereto, where the multiple nested tubulars have known defects which are captured as the true image for purposes of training the DNN. In one or more embodiments, the plurality of samples can include corresponding raw measurements of the one or mor tubulars, e.g. as a response image or a raw measurement image.

The more samples in the training database 802 and the more diverse the samples, the better the performance of the DNN. The training database 802 can comprise at least 10,000 samples. The samples can have different number of tubulars, different positions of the tubulars, different thicknesses, different physical properties (e.g., resistivity, permittivity, conductivity, permeability, etc.) of material near the tubulars, different parameters of eccentricity of the tubulars, different ovality, different bending, etc., and combinations thereof.

To begin training, the sample inverted images from the training database 802 are fed to the CNN 804 (i.e. a DNN having one or more convolutional layer) to produce output images, i.e. corrected images. The process of training finds optimum network parameters to minimize misfit between corrected images produced by the CNN 804 and corresponding true images in the training database 802 according to an error metric. The CNN 804 outputs a corrected image, and the corresponding true image from the training database 802 is compared at 806 with the corrected image.

The comparison 806 is evaluated via an error function 808. The error function 808 is defined as the sum of square errors of the logarithm of resistivity for each pixel, represented by the following equation:

$$E_n = \sum_{i=1}^{M}(p_i - q_i)^2 \quad (1)$$

where $E_n$ is the error between the true image and the corrected image produced by the CNN 804 for the $n^{th}$ training example, n is the index of training examples, i is the index of pixels, M is the number of pixels in an image, p is the true image (i.e. with true tubular integrity property values of the tubular(s)), and q is the corrected image (i.e. with the process tubular integrity property values of the tubular(s)).

The calculated error is fed to a training optimization algorithm 810 which can include a loss function defined as the mean square error for a whole training batch defined, represented as follows:

$$L = \sum_{n \in batch} E_n \quad (2)$$

where L is the loss function, and batch represents the whole training batch. The loss can also be calculated using mini-batches, e.g. using mini-batch gradient descent, where the minibatches are a subset of the total dataset. The size of the minibatch is a hyperparameter that can be adjusted during training to optimize results. Other network parameters, e.g. hyperparameters, weight parameters, of the CNN can be adjusted based on the training optimization algorithm 810. In one or more embodiments, the training optimization algorithm can use gradient descent. In one or more embodiments, in addition to finding optimum parameters for the CNN, training the CNN can also include finding optimum hyperparameters for inversion (e.g. regularization parameters) by including the corresponding raw measurement images in the samples with the true images and the inverted images.

In one or more embodiments, cross-validation, e.g. exhaustive or non-exhaustive, is used to evaluate the accuracy of the CNN 804. For example, K-fold cross-validation can be used to evaluate accuracy of the CNN 804. K-fold cross-validation uses a single parameter "K" that refers the number of groups that a given sample dataset can be randomly split into. K-fold cross-validation can estimate the skill of the CNN 804 on unseen data, e.g. estimating how the CNN 804 is expected to perform in general when used to make predictions on data not used during training. In one or more embodiments, K=10, but other K, e.g. 5, 15, or 20, can be chosen. For example, a K value can be chosen that evenly splits the data set into groups have the same number of samples. In one or more embodiments, a single subsample is retained as validation data for testing the CNN 804, and the remaining K−1 subsamples are used as training data. Other types of cross-validations can be used, e.g. leave-p-out cross-validation, leave-one-out cross-validation (equivalent to K-fold cross-validation where the number of observations equals K), holdout cross-validation, Monte Carlo cross-validation, or nested cross-validation (e.g. k*1-fold cross-validation), or the like.

During training the sample dataset can be split from the training database 802 into a training set containing training data, a test set containing test data, and a validation set containing validation data. To avoid over-fitting to the training set, the training can be stopped if there is no improvement for a validation set for 3 consecutive epochs. An "epoch" is a single iteration over the entire training set, i.e. one pass through all the training data. For example, for a training set of size d and a mini-batch size b, then an epoch would be equivalent to d/b model updates. In one or more embodiments, the training is complete when the error in the validation data is decreasing, when the CNN 804 performs well on the training data, and when the CNN 804 performs well on the test data. In one or more embodiments, the test data is not used for training of the CNN 804.

The flowcharts herein are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more computer-readable media (e.g. computer-readable media 128 in FIG. 1). Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Figure 9:
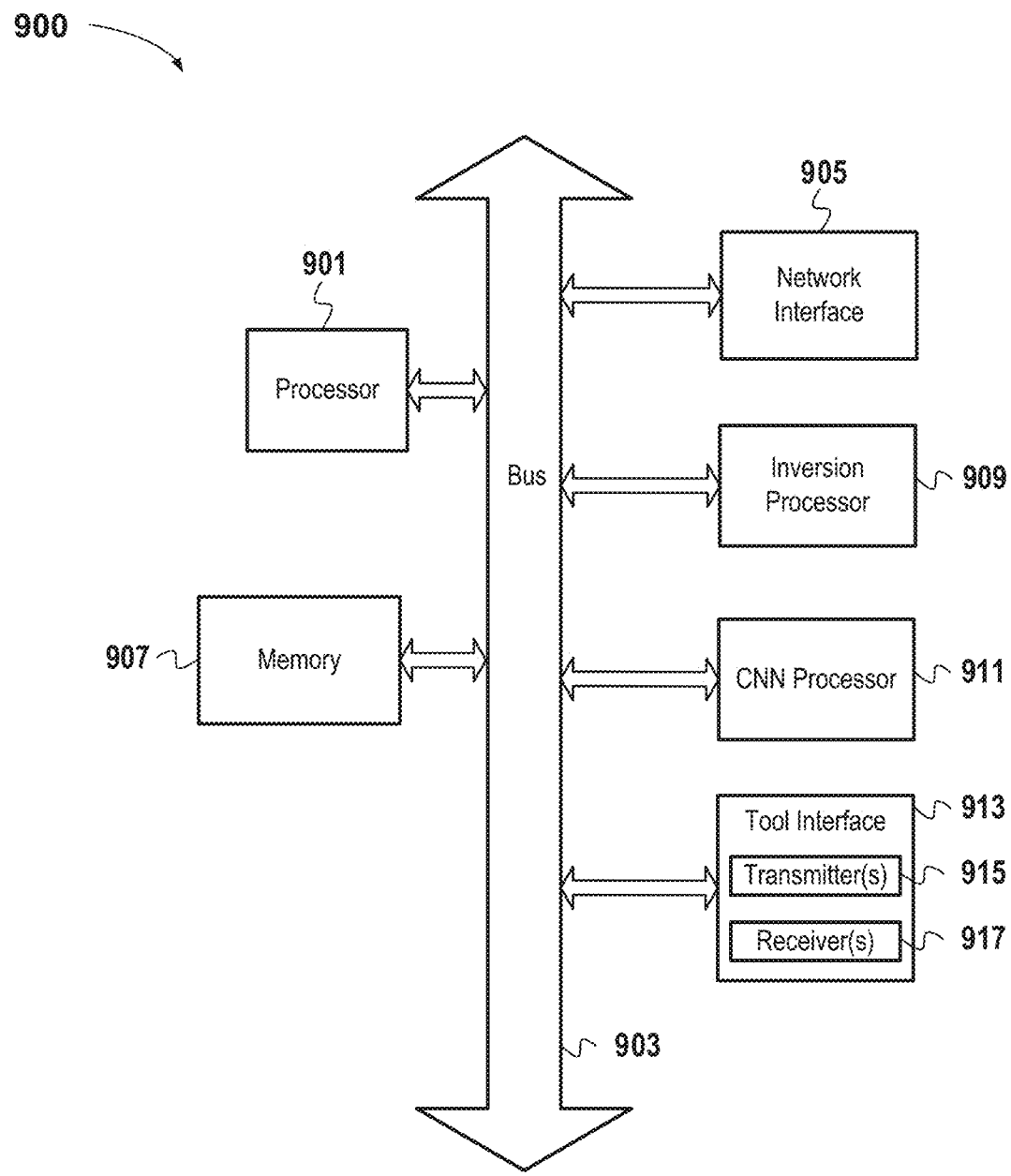
FIG. 9 depicts an example computer system with functionality and/or one or more processors for carrying out one or more of the methods described above, according to one or more embodiments.

FIG. 9 depicts an example computer system 900 with functionality and/or one or more processors for carrying out one or more of the methods described above, according to one or more embodiments. The computer system includes a processor 901 (possibly including multiple processors, multiple cores, multiple nodes, and/or implementing multi-threading, etc.) and memory 907. The memory 907 may be system memory or any one or more of the above already described possible realizations of machine-readable media. The computer system also includes a bus 903 and a network interface 905. The system communicates via transmissions to and/or from remote devices via the network interface 905 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes an inversion processor 909, a CNN processor 911, and a tool interface 913. The inversion processor 909 and/or the processor 901 can perform the inversion on the measurements to provide inverted tubular integrity properties and can arrange the inverted tubular properties into an inverted image, according to any of the embodiments described above. The CNN processor 911 and/or the processor 901 can perform one or operations to train the CNN and to produce one or more corrected images based on the inverted images fed thereto according to any of the embodiments described above. The tool interface 913 includes one or more transmitter interfaces 915 and one or more receiver interfaces 917. A machine-readable medium having program code executable by the processor 901 can initiate measurements of the multiple nested tubulars (as described above) via the tool interface 913. For example, program code can initiate transmission of an electromagnetic signal via one or more transmitters via the one or more transmitter interfaces 915 and can initiate measurements via one or more receivers via the receiver interface 917. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 10 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for training and operating neural networks as described herein, such as embodiments of DNNs and CNNs described above, may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "up-hole," "upstream," or other like terms shall be construed as generally from the formation toward the surface, e.g., toward wellhead 14 in FIG. 1, or toward the surface of a body of water; likewise, use of "down," "lower," "downward," "down-hole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Numerous examples are provided herein to enhance understanding of the present disclosure. A specific set of example embodiments are provided as follows:

Example A: A method for inspecting tubular integrity comprising: conveying an electromagnetic pipe inspection tool inside an innermost tubular of multiple nested tubulars, wherein the electromagnetic pipe inspection tool has one or more transmitters and one or more receivers; taking measurements of the multiple nested tubulars with the electromagnetic pipe inspection tool; inverting the measurements for a tubular integrity property of each individual tubular of the multiple nested tubulars to provide inverted tubular integrity properties; arranging the inverted tubular integrity properties into an inverted image representative of an estimated tubular integrity property of each individual tubular; and feeding the inverted image to a pre-trained deep neural network (DNN) to produce a corrected image, wherein the DNN comprises at least one convolutional layer, and wherein the corrected image comprises a representation of a corrected tubular integrity property of each individual tubular of the multiple nested tubulars.

In one or more embodiments of Example A, the inversion is based on a radial one-dimensional (R1D) inversion model, and, optionally, the method in Example A further comprises correcting, via the DNN, inversion artifacts introduced by the RID inversion model. In one or more embodiments of Example A, taking measurements of the multiple nested tubulars with the electromagnetic pipe inspection tool comprises one or more of the following (1) transmitting electromagnetic fields at one or more frequencies with the one or more transmitters and measuring at least one of a real-part, an imaginary-part, an absolute, an amplitude, and a phase of a received signal at the one or more frequencies with the one or more receivers; or (2) exciting the multiple nested tubulars with pulsed electromagnetic fields with the one or more transmitters and measuring a decay response of the pulsed electromagnetic fields in the time domain with the one or more receivers. In one or more embodiments of Example A, the tubular integrity property comprises a cross-sectional thickness, a magnetic permeability, an electrical conductivity, or a combination thereof. In one or more embodiments of Example A, a value assigned to each pixel in the corrected image is proportional to a percentage change of the tubular integrity property of each of the individual tubulars of the multiple nested tubulars from a nominal tubular integrity property of each of the individual tubulars of the multiple nested tubulars. In one or more embodiments of Example A, feeding the inverted image to the pre-trained DNN comprises splitting the inverted image into sections based on depth. In one or more embodiments of Example A, the pre-trained DNN further comprises at least one of a concatenation layer, a summation layer, a max pooling layer, an up-sampling layer, and a dense layer.

The method in Example A can further comprise training the DNN to provide the pre-trained DNN, wherein training the DNN comprises building a database by using at least one of measurements of known cases and simulation, wherein the database includes a plurality of samples, and wherein each sample of the plurality of samples comprises a true image of the tubular integrity property of each of the individual tubulars of the multiple nested tubulars and a corresponding inverted image, and, optionally, wherein training the DNN further comprises finding optimum network parameters to minimize a misfit between output images produced by the DNN and corresponding true images according to an error metric. In one or more embodiments of Example A, taking measurements of the multiple nested tubulars with the electromagnetic pipe inspection tool comprises taking azimuthal measurements of the multiple nested tubulars using the electromagnetic pipe inspection tool, and, optionally, at least one of the following (in any order): (1) wherein the inverted image comprises a three-dimensional (3D) inverted image, and wherein the 3D inverted image has depth as a first dimension, azimuth as a second dimension, and the inverted tubular integrity property as a third dimension; (2) wherein the corrected image comprises a 3D representation of the tubular integrity property of each the individual tubulars of the multiple nested tubulars; or (3) wherein the convolutional layer comprises a convolutional filter, and wherein the convolutional filter is 3D filter.

Example B: One or more non-transitory computer-readable media comprising program code for inspecting tubular integrity, the program code to: initiate measurements of multiple nested tubulars with an electromagnetic pipe inspection tool conveyed inside an innermost tubular of the multiple nested tubulars; perform an inversion on the measurements for a tubular integrity property of each individual tubular of the multiple nested tubulars to provide inverted tubular integrity properties; arrange the inverted tubular integrity property into an inverted image representative of an estimated tubular integrity property of each individual tubular; and feed the inverted image to a pre-trained DNN to produce a corrected image, wherein the DNN comprises at least one convolutional layer, and wherein the corrected image comprises a representation of a corrected tubular integrity property of each individual tubular of the multiple nested tubulars. In one or more embodiments of Example B, the tubular integrity property comprises a cross-sectional thickness, a magnetic permeability, an electrical conductivity, or a combination thereof. In one or more embodiments of Example B, a value assigned to each pixel in the corrected image is proportional to a percentage change of the tubular integrity property of each of the multiple nested tubulars from a nominal tubular integrity property of each of the multiple nested tubulars.

Example C: A system comprising: an electromagnetic pipe inspection tool disposed inside an innermost tubular of multiple nested tubulars; a pre-trained DNN comprising at least one convolutional layer; a processor; and a computer-readable medium having program code executable by the processor to: initiate measurements of the multiple nested tubulars with the electromagnetic pipe inspection tool conveyed inside the innermost tubular; perform an inversion on the measurements for a tubular integrity property of each individual tubular of the multiple nested tubulars to provide inverted tubular integrity properties; arrange the inverted tubular integrity properties into an inverted image representative of an estimated tubular integrity property of each individual tubular; and feed the inverted image to the pre-trained DNN to produce a corrected image, wherein the corrected image comprises a representation of a corrected tubular integrity property of each individual tubular of the multiple nested tubulars.

The invention claimed is:

1. A method for inspecting tubular integrity comprising:
conveying an electromagnetic pipe inspection tool inside an innermost tubular of multiple nested tubulars, wherein the electromagnetic pipe inspection tool has one or more transmitters and one or more receivers;
taking measurements of the multiple nested tubulars with the electromagnetic pipe inspection tool;
inverting the measurements for a tubular integrity property of each individual tubular of the multiple nested tubulars to provide inverted tubular integrity properties;
arranging the inverted tubular integrity properties into an inverted image representative of an estimated tubular integrity property of each individual tubular; and
feeding the inverted image to a pre-trained deep neural network (DNN) to produce a corrected image,
wherein the DNN comprises at least one convolutional layer, and
wherein the corrected image comprises a representation of a corrected tubular integrity property of each individual tubular of the multiple nested tubulars.

2. The method of claim 1, wherein the inversion is based on a radial one-dimensional (R1D) inversion model.

3. The method of claim 2, further comprising correcting, via the DNN, inversion artifacts introduced by the R1D inversion model.

4. The method of claim 1, wherein taking measurements of the multiple nested tubulars with the electromagnetic pipe inspection tool comprises
transmitting electromagnetic fields at one or more frequencies with the one or more transmitters; and
measuring at least one of a real-part, an imaginary-part, an absolute, an amplitude, and a phase of a received signal at the one or more frequencies with the one or more receivers.

5. The method of claim 1, wherein taking measurements of the multiple nested tubulars with the electromagnetic pipe inspection tool comprises
exciting the multiple nested tubulars with pulsed electromagnetic fields with the one or more transmitters; and
measuring a decay response of the pulsed electromagnetic fields in the time domain with the one or more receivers.

6. The method of claim 1, wherein the tubular integrity property comprises a cross-sectional thickness, a magnetic permeability, an electrical conductivity, or a combination thereof.

7. The method of claim 1, wherein a value assigned to each pixel in the corrected image is proportional to a percentage change of the tubular integrity property of each of the individual tubulars of the multiple nested tubulars from a nominal tubular integrity property of each of the individual tubulars of the multiple nested tubulars.

8. The method of claim 1, wherein feeding the inverted image to the pre-trained DNN comprises splitting the inverted image into sections based on depth.

9. The method of claim 1, wherein the pre-trained DNN further comprises at least one of a concatenation layer, a summation layer, a max pooling layer, an up-sampling layer, and a dense layer.

10. The method of claim 1, further comprising training the DNN to provide the pre-trained DNN,
wherein training the DNN comprises building a database by using at least one of measurements of known cases and simulation,
wherein the database includes a plurality of samples, and
wherein each sample of the plurality of samples comprises a true image of the tubular integrity property of each of the individual tubulars of the multiple nested tubulars and a corresponding inverted image.

11. The method of claim 10, wherein training the DNN further comprises finding optimum network parameters to minimize a misfit between output images produced by the DNN and corresponding true images according to an error metric.

12. The method of claim 1, further comprising training the DNN to provide the pre-trained DNN,
wherein training the DNN comprises
building a database by using at least one of measurements of known cases and simulation, and
finding optimum hyperparameters for inversion,
wherein the database includes a plurality of samples, and
wherein each sample of the plurality of samples comprises a true image of the tubular integrity property of each of the individual tubulars of the multiple nested tubulars and corresponding raw measurements of the multiple nested tubulars.

13. The method of claim 1, wherein taking measurements of the multiple nested tubulars with the electromagnetic pipe inspection tool comprises taking azimuthal measurements of the multiple nested tubulars using the electromagnetic pipe inspection tool.

14. The method of claim 13, wherein the inverted image comprises a three-dimensional (3D) inverted image, and
wherein the 3D inverted image has depth as a first dimension, azimuth as a second dimension, and the inverted tubular integrity property as a third dimension.

15. The method of claim 13, wherein the corrected image comprises a 3D representation of the tubular integrity property of each the individual tubulars of the multiple nested tubulars.

16. The method of claim 13, wherein the convolutional layer comprises a convolutional filter, and wherein the convolutional filter is 3D filter.

17. One or more non-transitory computer-readable media comprising program code for inspecting tubular integrity, the program code to:

initiate measurements of multiple nested tubulars with an electromagnetic pipe inspection tool conveyed inside an innermost tubular of the multiple nested tubulars;
perform an inversion on the measurements for a tubular integrity property of each individual tubular of the multiple nested tubulars to provide inverted tubular integrity properties;
arrange the inverted tubular integrity property into an inverted image representative of an estimated tubular integrity property of each individual tubular; and
feed the inverted image to a pre-trained DNN to produce a corrected image,
wherein the DNN comprises at least one convolutional layer, and
wherein the corrected image comprises a representation of a corrected tubular integrity property of each individual tubular of the multiple nested tubulars.

18. The computer-readable media of claim 17, wherein the tubular integrity property comprises a cross-sectional thickness, a magnetic permeability, an electrical conductivity, or a combination thereof.

19. The computer-readable media of claim 17, wherein a value assigned to each pixel in the corrected image is proportional to a percentage change of the tubular integrity property of each of the multiple nested tubulars from a nominal tubular integrity property of each of the multiple nested tubulars.

20. A system comprising:
an electromagnetic pipe inspection tool disposed inside an innermost tubular of multiple nested tubulars;
a pre-trained DNN comprising at least one convolutional layer;
a processor; and
a computer-readable medium having program code executable by the processor to:
initiate measurements of the multiple nested tubulars with the electromagnetic pipe inspection tool conveyed inside the innermost tubular;
perform an inversion on the measurements for a tubular integrity property of each individual tubular of the multiple nested tubulars to provide inverted tubular integrity properties;
arrange the inverted tubular integrity properties into an inverted image representative of an estimated tubular integrity property of each individual tubular; and
feed the inverted image to the pre-trained DNN to produce a corrected image,
wherein the corrected image comprises a representation of a corrected tubular integrity property of each individual tubular of the multiple nested tubulars.

* * * * *